3,266,893
METHOD FOR MANUFACTURING POROUS SINTERABLE ARTICLES
Joseph C. Duddy, Trevose, Pa., assignor to The Electric Storage Battery Company, a corporation of New Jersey
No Drawing. Continuation of application Ser. No. 210,187, July 16, 1962. This application June 17, 1965, Ser. No. 464,838
16 Claims. (Cl. 75—222)

This application is a continuation of application Serial No. 210,187, filed July 16, 1962, and now abandoned, which is a continuation-in-part of application Serial No. 33,942, filed June 6, 1960, and now abandoned.

The present invention generally relates to improvements in the process of manufacturing porous metallic bodies. More specifically, the present invention is concerned with a new and improved method for manufacturing porous sintered electrodes of the type utilized in electric batteries and fuel cells.

An object of the present invention is to provide a process which permits metal powders to be molded into shapes suitable for electrode applications and subsequently sintered without the loss of interparticle contact or porosity.

Another object of the present invention is to provide a new and improved method of sintering metal powders wherein the metal powder is uniformly and homogeneously dispersed throughout a thermoplastic resin binder, the resulting thermoplastic mass being shaped as by calendering or extruding, and the thermoplastic binder being removed in fractions in subsequent sintering.

The integrated surface area and the pore structure of an electrode are important factors in controlling the electrode performance whether the final product be a battery electrode or a fuel cell element. For fuel cell applications where a gas is introduced in counter-current opposition to the direction of an electrolyte penetration, however, uniformity of electrode structure is of the greatest importance, particularly with respect to pore size and distribution. In the ideal case all pores should be substantially the same diameter in order that back pressure of the gas and the capillarity pressures of the electrolyte will balance in each pore assuring a maximum solid-gas liquid interface. While uniform distribution of electrode material throughout a thermoplastic binder prior to final structuralization by sintering is an aid in obtaining product uniformity in the manufacture of thin flat electrodes, it has been found that as the electrode configuration becomes more complex and where the electrodes are required for mechanical considerations to be made thicker, that this process loses some of its advantages. For example, it has been found that interparticle contact and strength is often lost and large voids formed by the gaseous products produced by the thermal decomposition of the thermoplastic binder escaping from the matrix during sintering. In extreme cases, these escaping combustion products have resulted in electrodes totally lacking in physical strength.

It is, therefore, another object of the present invention to provide a method of producing sintered electrodes by means of the temporary binder method described above in which means are provided to facilitate the removal of the binder resin without disrupting the particle contact and pore uniformity of the article being sintered.

It is a further object of the present invention to provide another means for controlling the porosity of porous sintered bodies formed by the utilization of a temporary binder.

In my United States Patent No. 3,121,029 issued February 11, 1964, and assigned to the assignee of this invention, there is described a new and improved method for making electrodes. Specifically, in that patent there is disclosed a method for making electrodes in which a first thermoplastic resin, soluble in a given solvent, and a second thermoplastic resin, incompatible with the first thermoplastic resin and insoluble in the given solvent, are intimately mixed under heat and pressure on a rubber mill to produce a plasticized mass. After the plasticization and intimate mixing of the two resins, there is added to the plasticized mass the electrode material in powdered form for the particular type of electrode to be produced. After a time interval adequate for the thorough and homogeneous mixing of the powdered electrode material and the thermoplastic resins, the mixture is removed from the mill and shaped as by calendering or extruding to produce material suitable for electrode application. After the shaping of the material and such other treatment as is required to produce the electrode, the soluble resin is leached therefrom by means of a bath in a suitable solvent leaving the electrode material bound in a microporous matrix of the insoluble thermoplastic resin.

The present invention is characterized by the utilization of two intimately mixed incompatible thermoplastic resins, one of which is soluble in a solvent in which the other is insoluble, as a temporary binder for powdered metal electrodes to be structurized by subsequent sintering. The soluble thermoplastic resin is removed after the shaping of the electrode but prior to sintering thereof to leave the electrode to be sintered porous. In this manner there is provided uniformly distributed pores in the electrode for the escape of the gaseous products produced by the thermal decomposition of the other thermoplastic resin during sintering.

In carrying out the present invention, the combination of resins utilized must be chosen with the following criteria in mind. First, both resins must be thermoplastic and have substantially similar physical properties in the plastic state. In this respect, it is desirable that the resins have similar viscosities in the plastic state and that they become plastic within temperature ranges which overlap to an extent permitting the mixing of the resins in their plastic states without substantially degrading the resin with the lower temperature of plasticization. Secondly, the two resins must be substantially incompatible, that is, that after admixture in their thermoplastic states, they exist as separate and distinct phases in the product, the one not entering in any substantial degree into solution in the other. Thirdly, one resin must be readily soluble in a solvent in which the other resin is substantially insoluble. Lastly, the resins must be capable of a high degree of loading with finely divided electrode material.

By way of specific example, the following are some of the resins which may be utilized as permanent binder material; polyethylene, polypropylene, polystyrene, and polyvinyl chloride. The following water soluble thermoplastic resins are extremely advantageous from the economic point of view for use as the temporary soluble thermoplastic binder; polyethylene oxide, polyethylene glycol, and polyvinyl pyrrolidone. It should be understood, however, that it is not necessary that the soluble thermoplastic resin utilized as the temporary binder and pore forming agent be water soluble. Care should be taken, however, in choosing the solvent which is to be utilized for removing the temporary resin phase since it should not be one which will react adversely with the electrode material or the electrode grid structure if any is employed. In this respect, water soluble resins are also desirable because when water is used as the solvent, no adverse reaction has been found to occur.

The use of a soluble thermoplastic resin as a pore forming agent can be readily contrasted with the use of prior art pore forming agents such as starch, salt, horsehair, and the like which contribute nothing to the strength of the electrode during manufacture and, by their presence, limit the loading of the permanent binder and powdered electrode material and thus, require the presence of a higher percentage of binder. The reason that these prior art pore forming agents limit the loading of the non-soluble binder with electrode material is due to the fact that such materials are generally of the same physical nature as the active material, that is, granular or powdered in nature, and do not themselves act as binders.

Other objects and advantages of the present invention will be readily apparent from the following detailed description of the preferred embodiments thereof.

In carrying out one form of the present invention a tubular electrode for fuel cell application is produced by first intimately mixing under heat and pressure 0.85 part by weight of a soluble thermoplastic resin such as polyethylene oxide and 1.0 part by weight of an insoluble thermoplastic resin such as polyethylene to produce a plasticized mass. The intimate mixing of the two resins may be accomplished in an intensive mixer, an extruder, or a two roll rubber mill in which the rollers are operated at differential speeds. A temperature of about 275° F. has been found applicable for plasticizing the two resins. After the plasticization and admixing of the two thermoplastic resins has been completed, there is added to the plasticized mass 13 parts by weight of finely divided silver powder and 2.1 parts by weight of finely divided nickel powder. After a time interval adequate for the thorough and intimate mixing of the powdered silver and powdered nickel into the thermoplastic resins, the mixture may be removed from the mixing device and pelletized at room temperature for subsequent shaping as by calendering or extruding.

Those skilled in the art will understand how to select the time required for plasticizing the thermoplastic resins and also the time required to produce the intimate mixing described above. When the mixing of these materials is accomplished on a two roll mill, a time order of about two to three minutes is satisfactory for plasticizing and mixing the resins and a time on the order of about seven minutes is satisfactory for the mixing of the powdered metals into the plasticized resins.

Next the pelletized mixture of thermoplastic resins and electrode materials is fed to an extruder to produce tubes of the material. For this purpose a temperature of about 225° F. has been found to be a satisfactory temperature for extruder operation where the tubes being produced have a $\frac{1}{16}''$ wall and a $1''$ inside diameter, and when the extruder is operating at a speed which produces tubular material at the rate of one foot per minute. For fuel cell purposes, it has been desirable in order to provide for the maximum consolidation of the shaped material to extrude the material at least twice. This is accomplished by regrinding the tubes first produced at room temperature and re-extruding the material. The tubular shapes thus produced may be taken from the extruder on a belt type conveyer and subsequently cut to the desired length.

Following the shaping of the electrode material, the soluble resin phase is then leached therefrom by soaking the electrodes thus produced in a bath of a suitable solvent. Where the soluble thermoplastic resin is polyethylene oxide, which is water soluble, a water bath has been found satisfactory. The preferred method of leaching the polyethylene oxide from the electrodes thus produced is to suspend the tubes vertically in a suitable container and to continuously feed fresh water into the container at the top while drawing off a similar quantity from the bottom. The leaching operation may be considered to be complete when a sample of the leach water exhibits no froth upon vigorous shaking. For structures having the dimensions given heretofore, a leaching time of approximately four hours is considered to be adequate.

The residual leach water may then be removed from the electrodes by air drying or forced drying in a circulating air oven at a temperature below 180° F. Drying is complete when surface temperatures of the article assume ambient values or when the weight loss becomes constant. It should be understood that at this stage of the processing, the electrode materials are homogeneously and uniformly dispersed throughout a homogeneously porous matrix of the insoluble resin.

In accordance with the present invention, the structuralization by sintering of the electrode or other product being produced is carried out in three steps. The first of these steps involves a heat treatment during which the low molecular weight fractions or highly volatile portions of the temporary resin binder are removed. This step is preferably carried out at a temperature of from 375° F. to 450° F. The second step of final product structuralization provides for the elimination of the remainder of the resin binder and simultaneous light sintering of the metal particles. This step is carried out at a temperature of from about 450° F. to about 550° F., preferably in an oxygen starved atmosphere so as to remove the resin by vaporization rather than by rapid oxidation. During these two steps of final structuralization the pores produced by the removal of the soluble resin phase of the binder operate to provide escape channels through which the products produced by the thermal decomposition of the insoluble resin phase can escape without disrupting the particles and pore structuralization of the product. For the final step of structuralization, the product is then further heated to the temperature conventionally utilized to sinter the material of which the product is made.

Considering now the three step final structuralization of a fuel cell electrode in tubular form, it has been found desirable to carry out the first of these steps in three stages. After the leaching and drying steps have been completed, the porous tubes of resin bound electrode material are laid on heated rollers and are heat treated while slowly turned. In this respect, it should be noted that the rotation of the tubular electrodes during this step of final structuralization is functional in retaining the electrodes in their tubular form. Accordingly, it should be understood that where the electrode or other product being produced is not tubular that this step of the treatment can be carried out without rotating the elements being produced. Temperatures of approximately 200° F., 375° F., and 425° F. applied for periods of one-half hour, one hour and at least two hours, respectively, have been found to be adequate for the three stages of this step of structuralization. During the first stage substantially no resin is removed from the matrix due to the low temperature employed, however, this treatment has been found to anneal the tubes relieving stresses produced therein by the extrusion step. During the second and third stages of this step of treatment, the relatively volatile or low molecular weight fractions of the polyethylene resin binder are evolved as visible smoke.

The second step of final electrode structuralization is preferably accomplished in a furnace maintained at a temperature of approximately 500° F. As mentioned hereinbefore, it has been found desirable to maintain an oxygen starved atmosphere within the furnace so that the removal of the remainder of the resin is accomplished substantially by vaporization rather than by rapid oxidation. It has also been found desirable to support the electrodes on cradles, preferably constructed of screen or expanded metal, during this step of processing. During this step of structuralization, the electrode materials are lightly sintered and accordingly, there is produced a porous resin free electrode capable of being readily handled. This step of treatment can be considered completed when further heating results in no further weight loss. By way of specific example, however, for electrodes of the type described hereinbefore, a time period of approximately two hours has been found adequate for the removal of the resin binder and the light sintering of the silver-nickel powders.

To further strengthen the electrodes produced by the second step of heat treatment, it has been found desirable to additionally sinter the electrodes at higher temperatures. For this final step of structuralization, temperatures which are conventionally utilized in the sintering of the powdered materials of which the electrodes are made may be utilized. For tubular type silver-nickel fuel cell electrodes of the type described hereinbefore, a further heat treatment at a temperature of from about 1400° F. to 1100° F. for a period of from forty to ninety minutes has been found adequate. For this operation it is also desirable that the electrodes be supported on a cradle. This final step of structuralization has been found to impart extra strength to the electrodes without in any manner adversely affecting their dimensions. Still further, it should be understood that where it is desirable for the particular electrode material being utilized that this final sintering step may be carried out in a reducing or inert atmosphere.

While the present invention has been primarily illustrated in connection with the manufacture of a silver-nickel fuel cell electrode in tubular form, it should be understood that it is readily applicable to the production of electrodes of other sinterable metals, or combinations of sinterable metals and/or metal oxides as well as for the production of electrodes having other geometric configurations. By way of illustration and example and not by way of limitation, the following are further examples of electrode formulations which have been utilized to produce battery and fuel cell electrodes:

*Example 1*

| | Parts by weight |
|---|---|
| Polyethylene | 1.0 |
| Polyethylene oxide | 0.85 |
| Precipitated copper powder | 18 |

*Example 2*

| | |
|---|---|
| Polyethylene | 1.0 |
| Polyethylene oxide | 0.85 |
| Nickel powder | 18 |

*Example 3*

| | |
|---|---|
| Polyethylene | 1.0 |
| Polyethylene oxide | 0.85 |
| Nickel powder | 10 |
| Green nickel hydrate | 6.2 |

*Example 4*

| | |
|---|---|
| Polyethylene | 1.0 |
| Polyethylene oxide | 0.85 |
| Silver | 15 |
| Palladium | 0.14 |

*Example 5*

| | |
|---|---|
| Polyethylene | 1.0 |
| Polyethylene oxide | 0.85 |
| Silver | 15 |

*Example 6*

| | |
|---|---|
| Polyethylene | 1.0 |
| Polyethylene oxide | 1.0 |
| Silver | 17 |
| Nickel | 3 |

*Example 7*

| | |
|---|---|
| Polyethylene | 1.0 |
| Polyethylene oxide | 0.85 |
| Nickel | 16 |
| Silver | 3 |

In considering the present invention it should be understood that it is not necessary that the removal of the permanent resin binder be carried out in the three distinct steps described hereinbefore in connection with the fabrication of certain tubular fuel cell electrodes. It is desirable, however, that the removal of the resin binder during the sintering be carried out incrementally in order to avoid disruptive combustion of the resin binder. In this respect it has been found that if the article being sintered is brought to the sintering temperature in increments that the removal of the resin binder takes place in fractions with the more volatile fractions of the binder being removed first, followed successively by the less volatile fractions. It also should be noted that the increments should be chosen with respect to the permanent binder utilized and also that the raising of the article to the sintering temperature may be carried out by continuously raising the temperature as opposed to discrete steps. In such a case, the increments are infinitesimal. This method of resin removal results in the destructive distillation of the resin. In some instances it may be desirable upon the removal of the resin binder and the light sintering of the structure to further raise the temperature of the structure to achieve a heavier sintering.

*Example 8*

In accordance with this embodiment of the present invention 12.5 parts by weight of finely divided silver powder, 1.9 parts by weight of finely divided nickel powder, and 1.3 parts by weight of finely divided palladium powder were intimately mixed into 1 part by weight of polyethylene and 0.85 part by weight of polyethylene oxide in the manner described hereinbefore. Following the plasticization of the two resins and the intimate mixing therein of the electrode materials specified, the mixture was extruded to form tubular flat plate fuel cell electrodes of the type disclosed and claimed in the co-pending application of A. Hart, Serial No. 186,938, filed April 12, 1962, and assigned to the assignee of the present invention. The specific electrodes comprised a flat corrugated plate containing 26 parallel tubes. The extruded plates were 2⅜" in width, ⅛" thick with each of the 26 tubes having a centrally disposed gas channel 1/16" in diameter running therethrough. Following the extrusion of these electrode shapes, the polyethylene oxide was leached therefrom in a water bath to leave the electrode materials bound in a porous matrix of the polyethylene. The sintering of this electrode was carried out in an oxygen starved atmosphere in accordance with a sintering schedule in which it was brought from ambient temperature gradually to 150° C. in one hour. The temperature was then raised gradually from 150° C. to 190° C. in one hour. Next, the temperature was raised again gradually from 190° C. to 220° C., this rise occurring within one-half hour. The electrode was then permitted to stay at 220° C. for three hours following which the temperature was raised gradually over a period of one hour to 400° C. and held at that temperature for three hours. The electrode was then brought gradually from a temperature of 400° C. to a temperature of 600° C. in one hour and allowed to stand at 600° C. for one-half hour. Following this treatment, the electrode was allowed to cool.

*Example 9*

In accordance with another embodiment of the present invention a tubular fuel cell electrode having an outside diameter of ¾" and a wall thickness of 1/16" was extruded from a mix comprising 1 part by weight of polyethylene, 0.8 part by weight of polyethylene oxide and 14.3 parts by weight of titanium hydride. Following the admixture and plasticization of the two resins, the intimate mixing therein of the titanium hydride, the extrusion of the tubular form and the leaching out of the polyethylene oxide with water, the electrode was structuralized by sintering. The sintering was carried out on heated rollers which turned slowly during the sintering. The temperature schedule for this sintering was 3 hours at 107° C., 4 hours at 190° C., and 6 hours at 218° C.

Example 10

An electrode similar to that described in accordance with Example 9 was fabricated from an identical formula except that finely divided titanium powder was substituted for the powdered titanium hydride. Following the removal of the polyethylene oxide to leave the extruded form porous, this electrode was sintered in air by raising the temperature of the furnace gradually from ambient to 300° C. over a period of 2 hours. The furnace was then shut off and the electrode allowed to cool gradually.

In further considering the present invention, it should be understood that in addition to functioning as a pore forming agent, the soluble resin phase, until its removal serves as a binder for the electrode materials. In this respect, it considerably enhances the extrudability and handleability of the product being produced. It also permits a higher loading of the resin binder with electrode material, and provides an additional means of controlling the porosity of the final sintered product. In this respect the amount of electrode material with which a thermoplastic resin can be loaded depends primarily on the size of the particles to be sintered. As a general rule, it has been found that the amount of loading which can be achieved will increase as the size the metal particles increase. As will be understood by one skilled in the art, the limits to which the thermoplastic binders may be loaded with electrode materials for the purpose of carrying out the present invention, will be governed by the physical characteristics desired by the end product as well as practical manufacturing considerations. With respect to the ratio of the soluble thermoplastic resin binder to the insoluble thermoplastic binder, it has been found desirable that the soluble thermoplastic resin be present in amounts varying from one-half the amount by weight of the insoluble resin to two times the amount by weight of the insoluble resin. It should be understood, however, that the ratio of the two resins utilized within the ranges specified will be dictated in part by the physical strength and pore characteristics of the finished product as well as by the temperatures at which the structuralization of the electrode is achieved.

With specific reference to the manufacture of tubular fuel cell electrodes, the turning of the electrodes on heated rollers during the first step of electrode construction is believed to provide specific product advantages in addition to preserving the electrode shape. In this respect, the turning action in conjunction with the action of gravity tends to produce a surface structuralization regarding pore disposition that differs from the pore disposition in the bulk of the electrode. This surface pore disposition becomes functional in the end use, namely, in providing the most satisfactory occurrence of sites operative in promoting the electrochemical reaction occurring at and in fuel cell electrodes.

Having described the present invention, that which is claimed as new is:

1. A method of making electrodes which comprises the steps of intimately and homogeneously mixing a plasticized first insoluble thermoplastic resin, a plasticized second thermoplastic resin substantially insoluble in said first thermoplastic resin and a sinterable metallic electrode material in powdered form to produce a plasticized mass, said first thermoplastic resin being volatile at a temperature at or below the sintering temperature of said electrode material, both of said resins having substantially similar physical properties in the plastic state, shaping said mass, subjecting said shaped mass to a solvent in which said first thermoplastic resin and said electrode material are insoluble and in which said second thermoplastic resin soluble to substantially remove from said shaped mass said second thermoplastic resin to render said shaped mass porous and incrementally heating said porous shaped mass to volatilize in fractions said first thermoplastic resin in such a manner as to avoid disruptive combustion of said first thermoplastic resin and to sinter said electrode material.

2. A method of producing electrodes which comprises intimately and homogeneously mixing a plasticized first thermoplastic resin, a plasticized second thermoplastic resin substantially insoluble in said first thermoplastic resin in a ratio of from about one to two parts by weight of said first thermoplastic resin to about two to one parts by weight of said first thermoplastic resin, and a metallic electrode material in powdered form to produce a plasticized mass, said first thermoplastic resin being volatile at a temperature at or below the sintering temperature of said electrode material, both of said resins having substantially similar physical properties in the plastic state, shaping said mass to produce an electrode, subjecting said mass to a solvent in which said first thermoplastic resin and said electrode material are insoluble and in which said second thermoplastic resin is soluble to substantially remove from said electrode said second thermoplastic resin and then incrementally heating said electrode to volatilize in fractions said first thermoplastic resin and to sinter said electrode material.

3. The method of making porous sintered electrodes which comprises the steps of intimately and homogeneously mixing one part by weight of a plasticized first thermoplastic resin, one-half to two parts by weight of a plasticized second thermoplastic resin substantially insoluble in said first thermoplastic resin and a sinterable metallic electrode material to produce a plasticized mass, said first thermoplastic resin being volatile at a temperature at or below the sintering temperature of said electrode material, both of said resins having substantially similar physical properties in the plastic state, shaping said mass, subjecting said shaped mass to a solvent in which said first thermoplastic resin and said electrode material are insoluble and in which said second thermoplastic resin is soluble to substantially remove from said shaped mass said second thermoplastic resin to render said shaped mass porous, incrementally heating said porous shaped mass to a temperature sufficient to remove therefrom by fractions said first thermoplastic resin in such a manner as to avoid disruptive combustion of said thermoplastic resin and to lightly sinter said electrode material, and then further heating said porous shaped mass to the sintering temperature of said electrode material to sinter said electrode material to produce a porous shaped sintered electrode.

4. The method of making porous sintered electrodes which comprises the steps of intimately and homogeneously mixing under heat and pressure one part by weight of a first thermoplastic resin, one-half to two parts by weight of a second thermoplastic resin substantially insoluble in said first thermoplastic resin to produce a plasticized mass, said mixing being carried out at a temperature sufficient to plasticize both resins, homogeneously mixing into said mass a sinterable metallic electrode material to produce an electrode material, said first thermoplastic resin being volatile at a temperature at or below the sintering temperature of said electrode, both of said resins having substantially similar physical properties in the plastic state, shaping said material to electrode form, subjecting said shaped form to a solvent in which said first thermoplastic resin and said electrode material are insoluble and in which said second thermoplastic resin is soluble, to substantially remove from said shaped form said second thermoplastic resin to render said shaped form porous, incrementally heating said porous shaped form in an oxygen starved atmosphere to remove therefrom said first thermoplastic resin in fractions in such a manner as to avoid disruptive combustion of said first thermoplastic resin, and to provide a lightly sintered electrode, and then further heating said electrode to a sintering temperature to sinter said electrode material to produce a porous shaped sintered electrode.

5. The method of claim 4 wherein said electrode material is selected from the group consisting of silver, nickel, copper, nickel hydrate, palladium, titanium and mixtures thereof.

6. A method of making porous sintered tubular electrodes for fuel cells which comprises the steps of intimately and homogeneously mixing under heat and pressure one part by weight of polyethylene resin, one-half to two parts by weight of polyethylene oxide resin and a sinterable metallic electrode material to produce a plasticized mass, said mixing being carried out at a temperature sufficient to plasticize both resins, extruding said plasticized mass at least once to produce tubular electrodes, leaching from said electrodes said polyethylene oxide by means of a bath in a solvent in which said polyethylene and said electrode material are insoluble and said polyethylene oxide is soluble, annealing said electrode at a temperature of from about 200° F. to about 375° F., heating said electrode to a temperature of from about 375° F. to about 450° F. to remove therefrom the low molecular weight fractions of said polyethylene, said annealing and heating steps being carried out while said electrode is slowly rotated, further heating said electrode to a temperature from about 450° F. to about 550° F. to remove from said electrode the remainder of said polyethylene and to lightly sinter said electrode material and then further heating said porous shaped mass to a sintering temperature to further sinter said electrode.

7. A method of making a porous sintered tubular electrode for a fuel cell which comprises the steps of intimately and homogeneously mixing under heat and pressure one part by weight of polyethylene, 0.85 part by weight of polyethylene oxide, 13 parts by weight of finely divided silver powder and 2.1 parts by weight of finely divided nickel powder to produce a plasticized mass, said mixing being carried out at a temperature sufficient to plasticize both the polyethylene and the polyethylene oxide, extruding said plasticized mass to produce a tubular electrode, subjecting said electrode to a waterbath to leach therefrom the polyethylene oxide, annealing said tube on rotating rollers heated to a temperature of about 200° F., raising the temperature of said rollers in steps to about 375° F. and then to about 425° F. to remove therefrom the low molecular weight fractions of said polyethylene, further heating said electrode in an oxygen starved atmosphere at a temperature of approximately 500° F. to remove from said electrode the remainder of said polyethylene and to lightly sinter said silver and nickel particles and then further heating said electrode to a temperature of approximately 1100° F. to 1400° F. to further sinter said silver and nickel particles.

8. The method of making porous sintered electrodes which comprises the steps of intimately and homogeneously mixing one part by weight of a plasticized first thermoplastic resin, one-half to two parts by weight of a plasticized second thermoplastic resin substantially insoluble in said first thermoplastic resin and a sinterable metallic electrode material to produce a plasticized mass, said first thermoplastic resin being volatile at a temperature at or below the sintering temperature of said electrode material, both of said resins having substantially similar physical properties in the plastic state, shaping said mass, subjecting said shaped mass to a solvent in which said first thermoplastic resin and said electrode material are insoluble and in which said second thermoplastic resin is soluble to substantially remove from said shaped mass said second thermoplastic resin to render said shaped mass porous, drying said porous shaped mass, annealing said porous shaped mass, incrementally heating said porous shaped mass to remove said first thermoplastic resin in fractions in such a manner as to avoid disruptive combustion of said first thermoplastic resin, heating said porous shaped mass to a higher temperature to lightly sinter said electrode material and then further heating said porous shaped mass to a sintering temperature to sinter said electrode material to produce a porous sintered electrode.

9. The method of claim 8 wherein said electrode material is selected from the group consisting of silver, nickel, copper, nickel hydrate, palladium, titanium and mixtures thereof.

10. The method of claim 8 wherein said first thermoplastic resin is polyethylene and said second thermoplastic resin is polyethylene oxide.

11. A method of making porous, sintered bodies which comprises the steps of intimately and homogeneously mixing a plasticized first insoluble thermoplastic resin, a plasticized second thermoplastic resin substantially insoluble in said first thermoplastic resin and a powdered, sinterable material selected from the group consisting of metals, metal oxides and mixtures thereof to produce a plasticized mass, said first thermoplastic resin being volatile at a temperature at or below the sintering temperature of said sinterable material, both of said resins having substantially similar physical properties in the plastic state, shaping said mass, subjecting said shaped mass to a solvent in which said first thermoplastic resin and said sinterable material are insoluble and in which said second thermoplastic resin is soluble to substantially remove from said shaped mass said second thermoplastic resin to render said shaped mass porous and incrementally heating said porous shaped mass to volatilize in fractions said first thermoplastic resin in such a manner as to avoid disruptive combustion of said first thermoplastic resin and to sinter said sinterable material.

12. A method in accordance with claim 11 in which said first insoluble thermoplastic resin is polyethylene, polypropylene, polystyrene or polyvinyl chloride, and said second thermoplastic resin is polyethylene oxide, polyethylene glycol or polyvinyl pyrrolidone.

13. A method in accordance with claim 11 in which said first insoluble thermoplastic resin is polyethylene and said second thermoplastic resin is polyethylene oxide.

14. A method in accordance with claim 11 in which said powdered, sinterable material is a metal oxide.

15. A method in accordance with claim 11 in which said powdered, sinterable material is a metal.

16. A method in accordance with claim 11 in which said powdered, sinterable material is silver, nickel, copper, nickel hydrate, palladium, titanium and mixtures thereof.

References Cited by the Examiner

UNITED STATES PATENTS

| 1,988,861 | 1/1935 | Thorausch et al. | 75—222 X |
| 2,593,943 | 4/1952 | Wainer | 75—222 X |

L. DEWAYNE RUTLEDGE, *Primary Examiner.*

LEON D. ROSDOL, *Examiner.*

R. L. GRUDZIECKI, *Assistant Examiner.*